US009385647B2

(12) United States Patent
White

(10) Patent No.: US 9,385,647 B2
(45) Date of Patent: Jul. 5, 2016

(54) REDUCTION TECHNIQUE FOR PERMANENT MAGNET MOTOR HIGH FREQUENCY LOSS

(71) Applicant: HAMILTON SUNDSTRAND CORPORATION, Charlotte, NC (US)

(72) Inventor: Adam Michael White, Belvidere, IL (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 69 days.

(21) Appl. No.: 14/464,482

(22) Filed: Aug. 20, 2014

(65) Prior Publication Data
US 2016/0056737 A1    Feb. 25, 2016

(51) Int. Cl.
G05B 1/06    (2006.01)
H02P 6/00    (2016.01)
H02P 21/00   (2016.01)
G05D 19/02   (2006.01)

(52) U.S. Cl.
CPC ............ *H02P 29/50* (2016.02); *G05D 19/02* (2013.01); *H02P 6/001* (2013.01); *H02P 21/0035* (2013.01)

(58) Field of Classification Search
CPC ...... G05B 19/351; G05B 19/33; H02K 29/12; H02K 29/06
USPC .............................. 318/609, 610, 400.39, 661
See application file for complete search history.

(56) References Cited

U.S. PATENT DOCUMENTS

| | | | | |
|---|---|---|---|---|
| 6,646,409 B2* | 11/2003 | Won | ..................... | H02P 25/083 318/606 |
| 6,927,550 B2* | 8/2005 | Tamisier | ............. | F16C 32/0451 310/90.5 |
| 6,931,918 B2* | 8/2005 | Herb | ....................... | G01P 13/04 73/114.26 |
| 7,786,691 B2* | 8/2010 | Garlow | ................... | H02M 1/12 318/609 |
| 2005/0110450 A1* | 5/2005 | Stancu | .................... | H02P 6/183 318/609 |
| 2007/0296364 A1* | 12/2007 | Shoemaker | ......... | G05B 13/042 318/561 |
| 2013/0307447 A1* | 11/2013 | Rozman | ................ | G05B 11/01 318/400.02 |
| 2014/0139169 A1 | 5/2014 | Cade | | |
| 2015/0100139 A1 | 4/2015 | White | | |

FOREIGN PATENT DOCUMENTS

WO    9211588    7/1992

OTHER PUBLICATIONS

Extended European Search Report dated Feb. 26, 2015 in European Application No. 14186671.5.

(Continued)

*Primary Examiner* — Rina Duda
(74) *Attorney, Agent, or Firm* — Snell & Wilmer, LLP

(57) ABSTRACT

A system including a motor loss reducing controller system utilizing input band-shifting, an integral control architecture and inverse band-shifting is disclosed. The motor loss reducing controller system may provide correction of harmonic currents flowing to a PM motor from a motor controller. The compensation is added to the PWM voltage command signals. Within a compensator, d-axis and q-axis current feedback signals are frequency shifted down by n times the fundamental frequency. This converts the initial motor stationary harmonic currents into DC values. The frequency shifting is completed by multiplying the feedback signal by sine and cosine carrier signals of the shifted frequency. An integral controller may cancel any component of error at a desired DC value. An inverse frequency-shift transformation is applied to the output of the I controller in order to shift the command output signal back to the original reference frame.

15 Claims, 3 Drawing Sheets

(56) References Cited

OTHER PUBLICATIONS

Invitation Pursuant to Rule 62a(1)EPC dated Dec. 17, 2015 in European Application No. 15181718.6.

Extended European Search Report dated Mar. 17, 2016 in European Application No. 15181718.6.

* cited by examiner

LOOP GAIN AND PHASE WITH NO PHASE COMPENSATION

LOOP GAIN AND PHASE WITH 90° PHASE LEAD COMPENSATION

REDUCTION TECHNIQUE FOR PERMANENT MAGNET MOTOR HIGH FREQUENCY LOSS

FIELD

The present disclosure relates to automatic control system design, and more particularly, to systems and methods of motor loss reduction.

BACKGROUND

Conventional motor current controllers utilize a control loop feedback architecture. For instance, a proportional-integral-derivative PID controller may calculate an error value as the difference between a measured process variable and a desired set point/control variable. A proportional-integral (PI) controller may share some of the functionality as the functionality of a PID controller. High speed permanent magnet motors may experience high frequency rotor losses.

SUMMARY

The present disclosure relates to a system including a motor loss reducing controller system utilizing input band-shifting by a disturbance frequency, an integral control architecture and output inverse band-shifting and phase delay compensation by the disturbance frequency. The controller system may eliminate errors and/or take control action based on past and present control errors at the disturbance frequency. The feedback signal may be multiplied by the sine of the theta position of the frequency of interest and the feedback signal may be multiplied by the cosine of the theta position of the frequency of interest. Stated another way, the initial feedback signal is parsed into sine and cosine components at a particular frequency. This effectively band-shifts the feedback signal for treatment by the controller.

According to various embodiments, a system including a motor loss reducing controller system utilizing input band-shifting, an Integral control architecture and inverse band-shifting is disclosed. The motor loss reducing controller system may provide correction of harmonic currents flowing to a motor, such as a permanent magnet (PM) motor from a motor controller. The compensation is added to the pulse width modulated voltage command signals. Within a compensator, d-axis and q-axis current feedback signals are frequency shifted down by n times the fundamental frequency. N may be an integer or non-integer value. This converts the initial motor stationary harmonic currents into DC values. The frequency shifting is completed by multiplying the feedback signal by sine and cosine carrier signals of the shifted frequency. An integral controller may cancel any component of error at a desired DC value. An inverse frequency-shift transformation is applied to the output of the I controller in order to shift the command output signal back to the original reference frame.

According to various embodiments, a system comprising a motor loss controller structure configured motor loss reduction, comprising an input bandshifting stage, an integral controller stage, and an output inverse bandshifting with phase compensation stage are disclosed. The inputs to the system may be a feedback signal, a motor frequency signal and/or a control value. The sine of an angular component of the motor frequency signal may be multiplied by the feedback signal in the input bandshifting stage to form a first band-shifted feedback signal. The cosine of the angular component of the motor frequency signal may be multiplied by the feedback signal in the input bandshifting stage to form a second band-shifted feedback signal. Errors in the first band-shifted feedback signal and the second band-shifted feedback signal are cancelled via integral control in the I controller stage. An inverse frequency-shift transformation is applied to the output of the I controller stage in the output inverse bandshifting stage.

According to various embodiments a motor loss controller configured to band-shift a motor frequency signal by a multiple of a fundamental frequency into parsed sine and cosine components and multiply a feedback signal by each of the sine and cosine components is described herein. The motor loss controller may perform integral control of a control value band-shifted sine component and a control value band-shifted cosine component. The performing integral control may eliminate and/or reduce a disturbance on the output of the system by rejecting a DC disturbance in a band-shifted control value. The motor loss controller may inverse band-shift the sine component back to its original band. The motor loss controller may inverse band-shift the cosine component back to its original band. The motor loss controller may sum the inverse band-shifted sine component and the inverse band-shifted cosine component together to result in a controller output.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step.

The present disclosure relates to the design of a feedback controller for reducing motor loss, where the controller is configured for DC regulation of a control quantity as well as rejection (such as a complete rejection) of a disturbance at a known frequency. According to various embodiments, controller disclosed herein may be configured to, and/or utilized to, address this disturbance at the known frequency.

Figure 1:
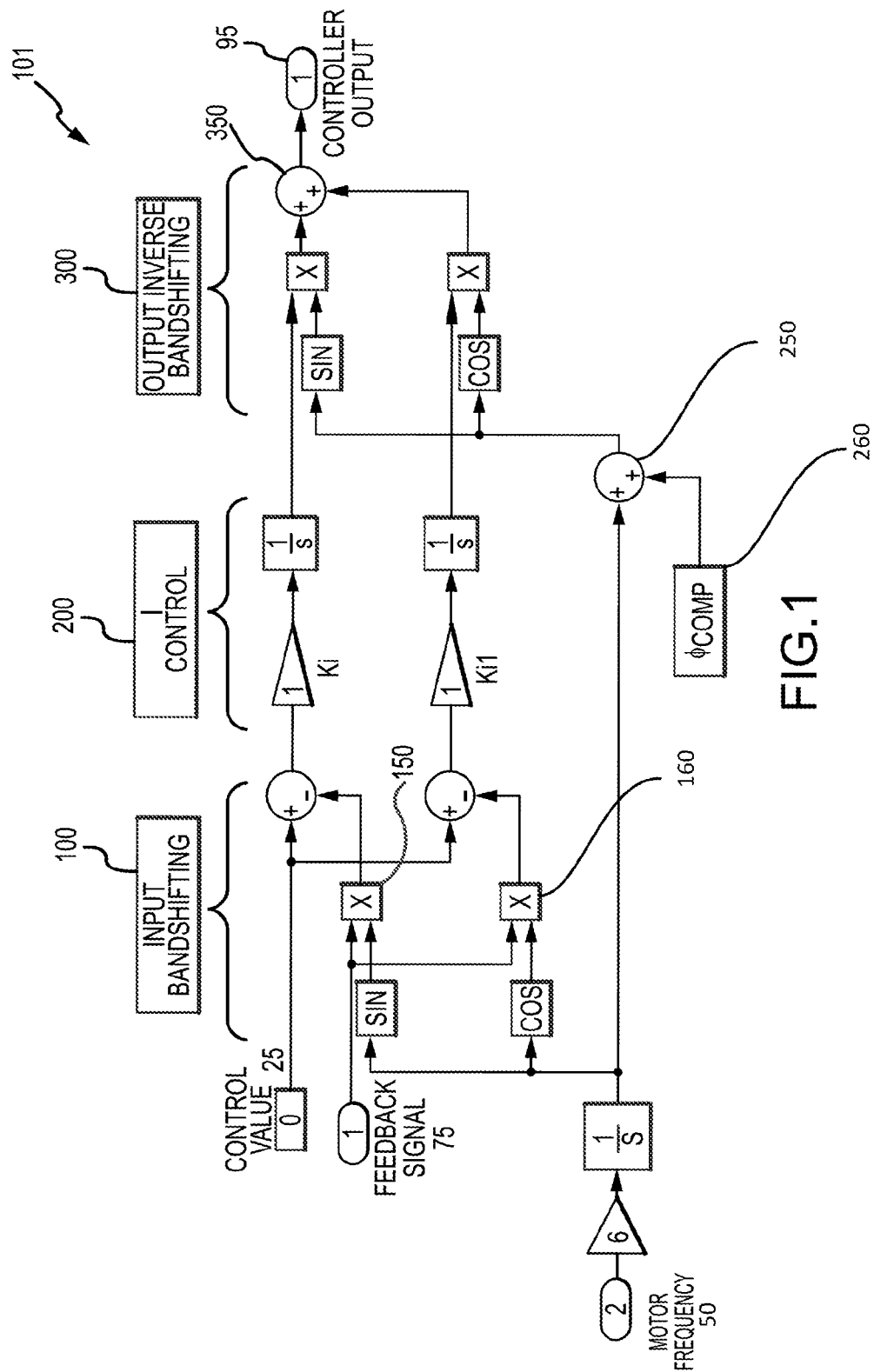
FIG. 1 depicts a representative structure of a feedback controller, in accordance with various embodiments.
Figure 2:
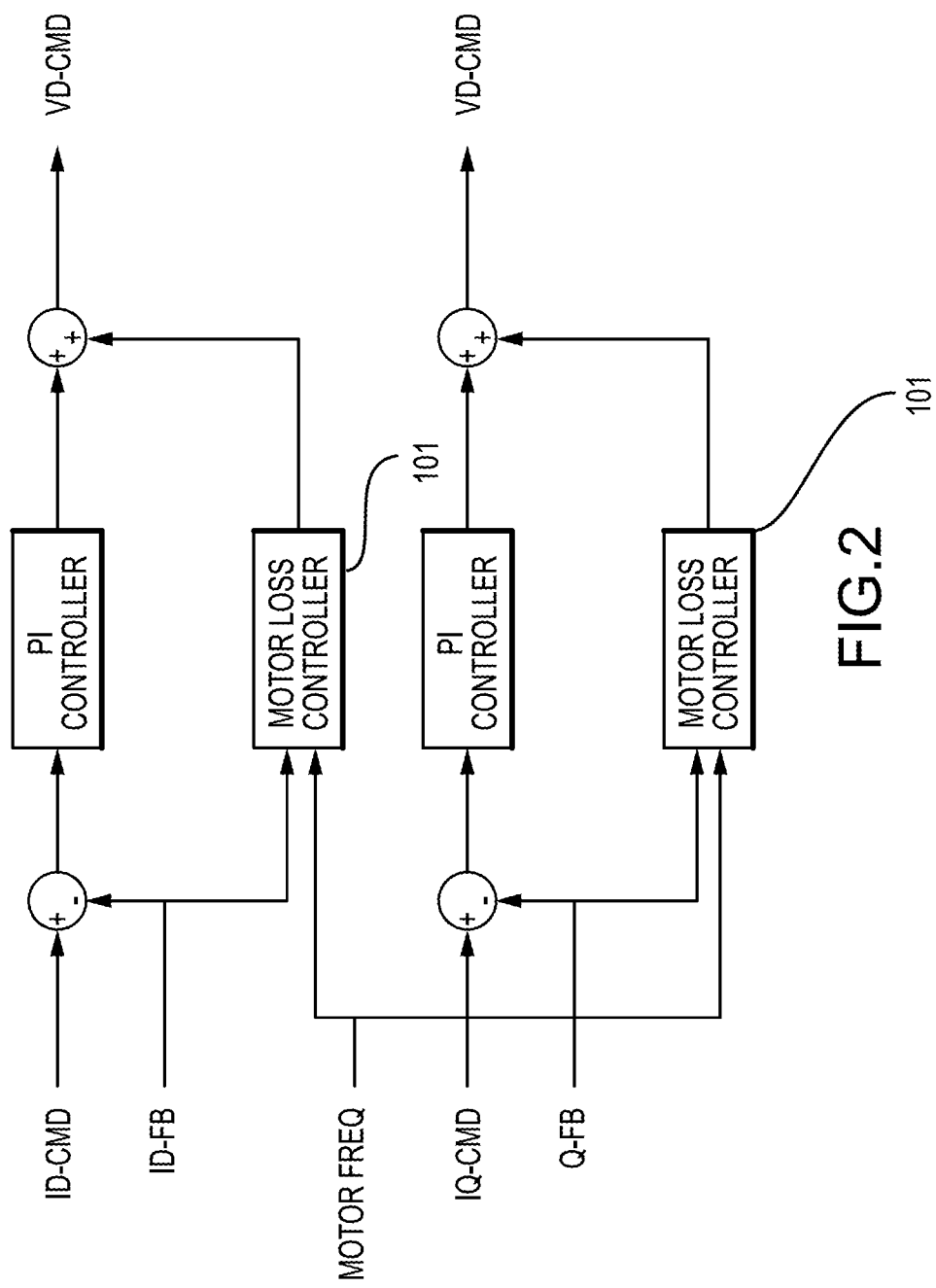
FIG. 2 depicts a representative current controller structure showing the d and q axis PI controllers for conventional current regulation in conjunction with motor loss controllers coupled in parallel, in accordance with various embodiments.

According to various embodiments and with reference to FIGS. 1 and 2, a controller configured to reduce high frequency rotor losses in a high speed permanent magnet motor is disclosed herein. The motor loss controller system 101 applies a compensation of current ripple at the fifth and seventh harmonic frequencies of a fundamental frequency on the AC side of a DC to AC inverter. The motor loss controller system 101 compensates for the fifth and seventh harmonic currents that are otherwise present on the AC output of the inverter flowing to the connected motor, thereby reducing losses in the inverter (e.g., the transistors, diodes and/or magnetics of the inverter), the feeders connecting the inverter and motor, and in particular, the motor.

In high speed PM motors connected to motor controller inverters, significant motor losses are commonly present due to fifth and seventh harmonic frequency power quality current distortions. Aerospace motors may operate at high speeds, for instance, at 1300 Hz. Thus, the fifth and seventh harmonic currents may be a high frequency value (e.g., 6500 and 9100 Hz). At these frequencies, eddy current rotor losses, stator lamination losses, rotor lamination losses, and skin effect losses may result in increased motor heating and thermal issues. Since motor eddy current and hysteresis losses increase at approximately the square of the frequency and the square of current amplitude, significant motor losses are produced due to the fifth and seventh harmonic currents.

According to various embodiments, a controller configured to correct fifth and seventh harmonic currents flowing to a PM motor from a motor controller are disclosed herein. The compensation is added to the pulse width modulated (PWM) voltage command signals. Within the controller, d-axis and q-axis current feedback signals are frequency shifted down by a multiple of the fundamental frequency, such as six times the fundamental frequency. This converts the initial motor stationary reference frame fifth harmonic currents and seventh harmonic currents into DC values. The frequency shifting is completed by multiplying the feedback signal by sine and cosine carrier signals of the shifted frequency. After this transformation, any disturbance at six times the fundamental in the d-axis and q-axis currents are transformed to DC values. Notably, in response to integral control, the fifth and seventh harmonics of the motor current are transformed into a sixth harmonic frequency in the DQ reference frame. Thus, in response to control and/or elimination of the sixth order harmonic distortion in the DQ reference frame, the fifth and/or seventh order harmonics in the actual motor currents are effectively eliminated. Thus, motor loss controller system 101 may be configured to eliminate distortion in the DQ axes at six times the fundamental frequency.

According to various embodiments, integral control may be utilized to completely cancel any component of error at DC (i.e. the error originally at the stationary fifth and seventh harmonics and at the sixth d-axis and q-axis harmonics). An inverse frequency-shift transformation is applied to the output of the I controller 200 stage in order to shift the command output signals back to the original reference frame.

The present motor loss controller system 101 comprises phase compensation added to the output inverse band-shifting stage 300 to compensate for phase lag between PWM control signals and the resultant change in the motor current. The phase compensation assists with stabilization of the motor loss controller where it would otherwise not have phase margin and would thus be unstable. Since the transformations and integral control are limited to affecting the loop gain of the motor loss controller system 101 at and near the frequency of the frequency shifting, the phase delay characteristics of the motor loss controller system 101 remain unchanged at frequencies which are a sufficient distance from the band-shifting frequency (see FIGS. 3 and 4).

Traditionally, controllers have been designed to regulate to a constant set point value, such as controlling a motor speed at a substantially constant 10,000 rpm. Proportional integral type controllers are well suited for holding steady the average value rate of the command, (e.g. 10,000 rpm); however, for systems having a reoccurring disturbance (such as current distortions causing motor loss), a proportional integral type controller is not able to eliminate the disturbance. In many circumstances, it is preferable that the oscillation be reduced or eliminated. Among other attributes, the controller disclosed herein provides an approach for eliminating and/or reducing that oscillation (e.g. a disturbance, such as a sinusoidal disturbance, at a known frequency).

According to various embodiments, and with reference to FIG. 1, the structure of a motor loss controller system 101 utilizing input band-shifting stage 100, I controller 200 stage and output inverse band-shifting stage 300 is disclosed. The inputs to the motor loss controller system 101 may include a control value 25, such as zero, a feedback signal 75, and an input at the motor frequency, which is a known frequency. The inputs to the motor loss controller system 101 may further include a phase shifting component as described further below. Depicted by representative multiplier box 150, the feedback signal may be multiplied by the sine of the $\omega(t)$ angular position of the integral of six times the motor frequency signal.

Direct-quadrature transformation is a mathematical transformation that rotates the reference frame of three-phase systems in an effort to simplify the analysis of three-phase circuits. The direct-quadrature transformation can be thought of in geometric terms as the projection of the three separate sinusoidal phase quantities onto two axes rotating with the same angular velocity as the sinusoidal phase quantities. The two axes are called the direct, or d, axis; and the quadrature or q, axis; that is, with the q-axis being at an angle of 90 degrees from the direct axis.

The inputs to the controller are the d or q axis feedback currents and the motor frequency. The controller reduces current distortion at 6 times the fundamental frequency in the d and q reference frame. Only the d-axis controller is shown (a virtually identical controller is used in the q-axis) in FIG. 1. A phase lead (see $\phi$ component 260 on FIG. 1) may be added to the output sine and cosine operation for a harmonic of interest, such as the sixth order harmonics, to compensate for plant behavior (for instance a 90 degree lead angle to compensate inductor lag between applied voltage and resultant current).

Depicted by representative multiplier box 160 the feedback signal may be multiplied by cosine of six times the $\omega(t)$ angular position of the integral of the motor frequency. Stated another way, the initial feedback signal is parsed into sine and cosine components at an integral of a particular frequency. This effectively band-shifts the feedback signal for treatment by the motor loss controller.

In the frequency domain, the feedback signal is shifted (e.g., down or up) by the determined frequency $\omega$, generally speaking, such that the disturbance oscillation becomes a DC quantity. The I controller 200 stage is configured to eliminate that disturbance because the disturbance is now at a DC level and can be eliminated by a I controller 200 stage. The six times $\omega(t)$ angular position of the integral of the motor frequency may be summed 250 with a phase lead 260 to compensate for phase delay. For instance, if at the sixth harmonic of the motor frequency has a 100 degree phase leg at the output of the system as compared to the motor frequency input, 100 degrees of phase delay compensation may be introduced to the system. Thus, the motor loss controller system 101 compensates for phase leg in the inverse band-shifting stage.

The motor loss reduction controller may be configured to act on the band-shifted (down) frequency signal to eliminate the disturbance of interest, such as the sixth order harmonic. The output inverse band-shifting stage 300 transforms the band-shifted treated signal back to the original frequency of the feedback signal. Stated another way, via integral control action, the I controller is able to reject, for example to perfectly reject, any DC disturbance at the I controller input, which therefore likewise rejects (due to input band-shifting and output inverse band-shifting) the AC disturbance that was present at feedback signal 75, at the six times motor frequency contained in integrated phase shifted motor frequency signal 50. The integral gain control output of the I controller 200 stage is multiplied with the sine component and the cosine component of the integrated phase shifted motor frequency signal 50. The outputs are summed together by a summer 350 and transmitted as an output as the controller output 95.

According to various embodiments and with reference to FIG. 2, a current controller structure showing the d and q axis PI controllers for conventional current regulation in conjunction with motor loss controller system 101 of FIG. 1 is shown.

Figure 3:
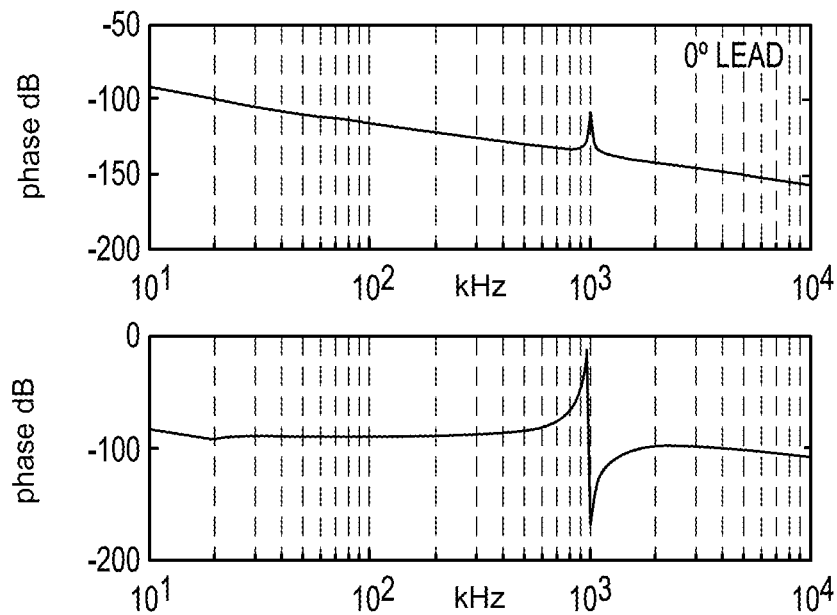
FIG. 3 depicts a loop gain and phase in accordance with various embodiments.

According to various embodiments and with reference to FIG. 3, the loop gain and phase of an embodiment of motor loss controller system 101. The loop gain comprises an integral plant in conjunction with the motor loss controller system 101 of FIG. 1. The motor frequency is 1000/6 Hz. The phase compensation is set to 0 degrees. Almost infinite gain at 1 kHz will result in the gain crossing 0 dB at 1 kHz (not shown in FIG. 3). The 180° phase lag at 1 kHz in conjunction with any sampling or sensor delays means that the system is likely to be unstable or will have very little gain margin.

Figure 4:
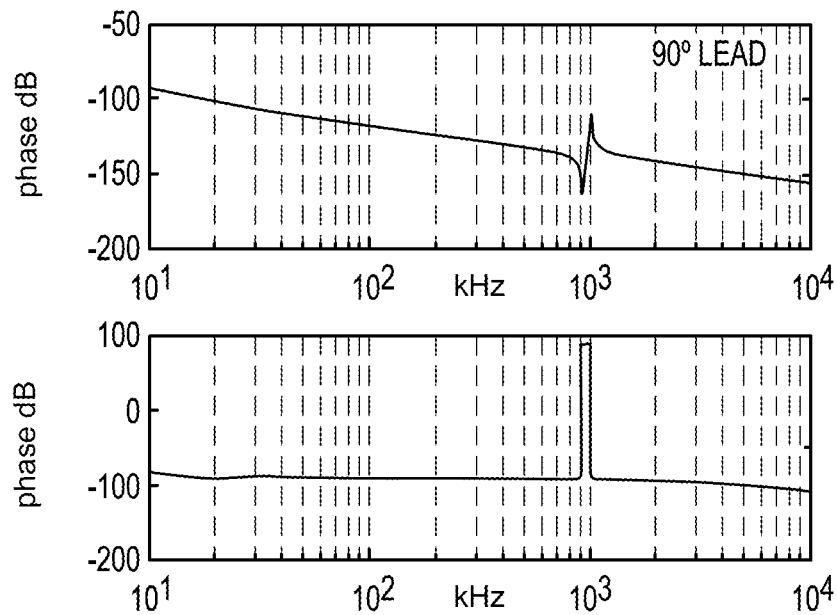
FIG. 4 depicts a loop gain and phase compensation set to 90° phase lead phase compensation at 1 kHz, in accordance with various embodiments.

According to various embodiments and with reference to FIG. 4, the loop gain and phase of an embodiment of motor loss controller system 101 is shown. The loop gain comprises an integral plant in conjunction with the motor loss controller system 101 of FIG. 1. The motor frequency is 1000/6 Hz. The gain at 1 kHz results in adequate disturbance rejection. The phase compensation is set to 90° phase lead phase compensation at 1 kHz, which compensates for 90° of phase lag in the integral plant. Thus, with the lead compensation, as depicted, the signal no longer dips down to minus 180 degrees phase lag. The loop phase near 1 kHz is 90° advanced relative to FIG. 3, thus 90° of phase margin is depicted, resulting in enhanced stability.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more."

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Different crosshatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system comprising:
a motor loss controller structure configured for motor loss reduction, comprising an input bandshifting stage, an integral controller stage, and an output inverse bandshifting stage;
wherein inputs to the system are a feedback signal, a motor frequency signal and a control value,
wherein the sine of an angular component of a multiple of the motor frequency signal is multiplied by the feedback signal in the input bandshifting stage to form a first band-shifted feedback signal,
wherein the cosine of the angular component of a multiple of the motor frequency signal is multiplied by the feedback signal in the input bandshifting stage to form a second band-shifted feedback signal,
wherein errors in the first band-shifted feedback signal and the second band-shifted feedback signal are cancelled via integral control in the integral controller stage,
wherein an inverse frequency-shift transformation is applied to an output of the integral controller stage in the output inverse bandshifting stage, and
wherein a phase lead compensation is introduced at the multiple of the motor frequency signal.

2. The system of claim 1, wherein the first band-shifted feedback signal is summed with the control value.

3. The system of claim 1, wherein the second band-shifted feedback signal is summed with the control value.

4. The system of claim 1, wherein the feedback signal comprises at least one of a d-axis component or a q-axis component.

5. The system of claim 1, wherein the system is configured to eliminate distortion in at least one of a d-axis or a q-axis at six times a fundamental frequency.

6. The system of claim 1, wherein the system is configured to eliminate fifth or seventh order harmonics of a motor current.

7. The system of claim 1, wherein the inputs to the system further comprise a phase shifting component.

8. The system of claim 1, wherein a conventional proportional-integral controller is implemented in parallel with the motor loss controller structure for both a d-axis and a q-axis.

9. A motor loss controller configured to:
band-shift a motor frequency signal by a multiple of a fundamental frequency into a parsed sine component and a cosine component and multiply a feedback signal by each of the parsed sine component and the cosine component;
perform integral control of a control value band-shifted sine component and a control value band-shifted cosine component, wherein the performing integral control is configured to at least one of eliminate or reduce a disturbance on an output of the motor loss controller by rejecting a DC disturbance in a band-shifted control value;
inverse band-shift the sine component back to its original band;
inverse band-shift the cosine component back to its original band;
sum the inverse band-shifted sine component and the inverse band-shifted cosine component together to result in a controller output; and
introduce a phase lead compensation to the inverse band-shifted sine component and the inverse band-shifted cosine component at the multiple of the fundamental frequency.

10. The motor loss controller of claim 9, further comprising phase shifting the inverse band-shifting of the sine component and phase shifting the inverse band-shifting of the cosine component.

11. The motor loss controller of claim 9, wherein the feedback signal comprises at least one of a d-axis component or a q-axis component.

12. The motor loss controller of claim 9, further comprising implementing a conventional PI controller in parallel with the motor loss controller for both a d-axis and a q axis of the feedback signal.

13. The motor loss controller of claim 9,
wherein the control value band-shifted sine component is created by summing the sine component of the band-shifted feedback signal with a control value, and
wherein the control value band-shifted cosine component is created by summing the cosine component of the band-shifted feedback signal with the control value.

14. The motor loss controller of claim 9, wherein the motor loss controller is configured to eliminate fifth or seventh order harmonics of a motor current.

15. The motor loss controller of claim 9, wherein the multiple of the fundamental frequency is six times the fundamental frequency.

* * * * *